United States Patent [19]

Yoda et al.

[11] Patent Number: 5,345,786
[45] Date of Patent: Sep. 13, 1994

[54] ABSORPTION HEAT PUMP AND COGENERATION SYSTEM UTILIZING EXHAUST HEAT

[75] Inventors: Hiroaki Yoda, Tsuchiura; Kenzi Machizawa; Koji Yamamoto, both of Ibaraki, all of Japan

[73] Assignee: Hitachi, Ltd., Tokyo, Japan

[21] Appl. No.: 109,445

[22] Filed: Aug. 20, 1993

[30] Foreign Application Priority Data

Aug. 27, 1992 [JP] Japan .................. 4-228327

[51] Int. Cl.⁵ .................. F25B 27/02; F25B 15/00; F24J 1/00
[52] U.S. Cl. .................. 62/476; 62/258.3; 62/141
[58] Field of Search .................. 62/476, 485, 324.2, 62/238.3, 141; 165/2, 481

[56] References Cited

U.S. PATENT DOCUMENTS

| | | | |
|---|---|---|---|
| 3,314,246 | 4/1967 | Hopkins et al. | 62/476 |
| 3,837,174 | 9/1974 | Miyagi | 62/141 |
| 4,291,545 | 9/1981 | Worsham | 62/238.3 |
| 4,942,734 | 7/1990 | Markbreiter et al. | 60/39.02 |
| 5,271,246 | 12/1993 | Yamauchi | 62/476 |
| 5,282,369 | 2/1994 | Ohuchi et al. | 62/476 |

FOREIGN PATENT DOCUMENTS

| | | | |
|---|---|---|---|
| 237262 | 2/1990 | Japan . | |
| 3045868 | 2/1991 | Japan | 62/238.3 |

Primary Examiner—Henry A. Bennet
Assistant Examiner—William C. Doerrler
Attorney, Agent, or Firm—Antonelli, Terry, Stout & Kraus

[57] ABSTRACT

An absorption heat pump and a cogeneration system are provided to have high efficiency of utilizing exhaust heat. An absorption heat pump having an evaporator, an absorber, a high-temperature regenerator, a low-temperature regenerator and a condenser is combined with a fuel cell such that the pump includes a cycle in which vapor exhaust heat from the fuel cell is used as a heat source for the evaporator and the high-temperature regenerator, and another cycle in which warm-water exhaust heat from the fuel cell is used as a heat source for the low-temperature regenerator.

7 Claims, 1 Drawing Sheet

ABSORPTION HEAT PUMP AND COGENERATION SYSTEM UTILIZING EXHAUST HEAT

BACKGROUND OF THE INVENTION

1. Field of the Invention

The present invention relates to an absorption heat pump and a cogeneration system which utilize exhaust heat.

2. Description of the Related Art

An example of a cogeneration system (electric energy-heat simultaneous supply system) is a fuel cell. A fuel cell, for example, a phosphoric acid fuel cell, is a system in which hydrogen gas ($H_2$) obtained by reforming city gas, etc. and oxygen ($O_2$) in air are respectively supplied to the cathode and anode that are separated from each other in a solution of phosphoric acid, in this example, so as to generate electric power. At the anode, hydrogen ions ($H^+$) which have moved from the cathode through the phosphoric acid solution, react with hydroxyl ions ($OH^-$) generated at the anode. As a result, water ($H_2O$) is generated, and heat of reaction is simultaneously generated. It is therefore necessary to cool the cell in order that power generation can be performed continuously. For this purpose, the heat of reaction is normally removed by water cooling. Since such exhaust heat has a temperature level which is not less than 100° C. and which reaches 180° C. as a highest temperature, when a gas-liquid separating apparatus is interposed, it is possible to extract saturated water vapor of 4 to 8 $kg/cm^2G$. Hydrogen gas for power generation is obtained, for example, by mixing methane gas ($CH_4$), the main component of city gas, with a part of the water vapor, and heating the mixture with a burner. Since exhaust gas resulting from combustion by the burner has a high temperature, when such exhaust heat is recovered with cooling water, it is possible to obtain exhaust-heat warm water normally having a temperature of 60° to 85° C.

The total quantity of heat that can be extracted in this way in the form of water vapor and warm water while a fuel cell generates power corresponds approximately to as much as 40% of the quantity of heat which can be obtained through direct combustion of the same amount of city gas (the amount of generated power corresponds approximately to 40% of that fraction). Therefore, it is essential to effectively utilize exhaust heats in order to improve the overall efficiency of the system.

An example of art related to this kind of system is disclosed, for example, in Japanese Patent Unexamined Publication No. 2-37262.

Various forms have been considered for %he utilization of exhaust heat. For example, it has been studied to use exhaust heat as the heat source of absorption-type refrigerators. When extracting warm water from a conventional absorption-type water-cooler/heater, however, it has been impossible to obtain a heat quantity of warm water which is above the input heat quantity, and effective utilization of exhaust heat has not been achieved. No consideration has been given to an exhaust heat processing system which is essential to maintaining the operation of a fuel cell, and no suitable system has been made for enabling exhaust heat of a fuel cell, which is operated in a continuous mode basically, to be applied to certain uses (such as cooling and heating of a predetermined space, and supply of hot-water) which can involve great changes in load. Thus, the problem of how to make a cogeneration system capable of utilizing exhaust heat highly efficiently has not been solved.

SUMMARY OF THE INVENTION

An object of the present invention is to provide an absorption heat pump and cogeneration system that is capable of effectively utilizing exhaust heat to improve the efficiency of the system.

According to one aspect of the present invention, there is provided an absorption heat pump which has an evaporator, an absorber, a high-temperature regenerator, a low-temperature regenerator and a condenser and which is capable of utilizing exhaust beau. The absorption heat pump capable of utilizing exhaust heat comprises: a first cycle in which vapor exhaust heat from a fuel cell is used as a heat source for evaporator; and a second cycle in which warm-water exhaust heat from the fuel cell is used as a heat source for the low-temperature regenerator.

According to another aspect of the present invention, there is provided a cogeneration system including an absorption heat pump which has an evaporator, an absorber, a high-temperature regenerator, a low-temperature regenerator and a condenser and which is capable of utilizing exhaust heat. The absorption heat pump comprises: a first cycle in which vapor exhaust heat from a fuel cell is used as a heat source for the evaporator; and a second cycle in which warm-water exhaust heat from the fuel cell is used as a heat source for the low-temperature regenerator, the absorption heat pump being combined with the fuel cell.

Cycles in which vapor exhaust heat from a fuel cell is supplied to the high-temperature regenerator and the evaporator while warm-water exhaust heat from the fuel cell is supplied to the low-temperature regenerator so that the exhaust heats are used as heat sources for the respective devices, may be formed to constitute cycles which effectively utilize exhaust heat and from which cold water is extracted. Cycles in which vapor exhaust heat is supplied as a heat source to the high-temperature regenerator while warm-water exhaust heat is supplied as a heat source to the evaporator, may be formed to constitute cycles which effectively utilize exhaust heat and from which warm water is extracted.

BRIEF DESCRIPTION OF THE DRAWING

The single drawing, i.e.

DESCRIPTION OF THE PREFERRED EMBODIMENTS

Figure 1:
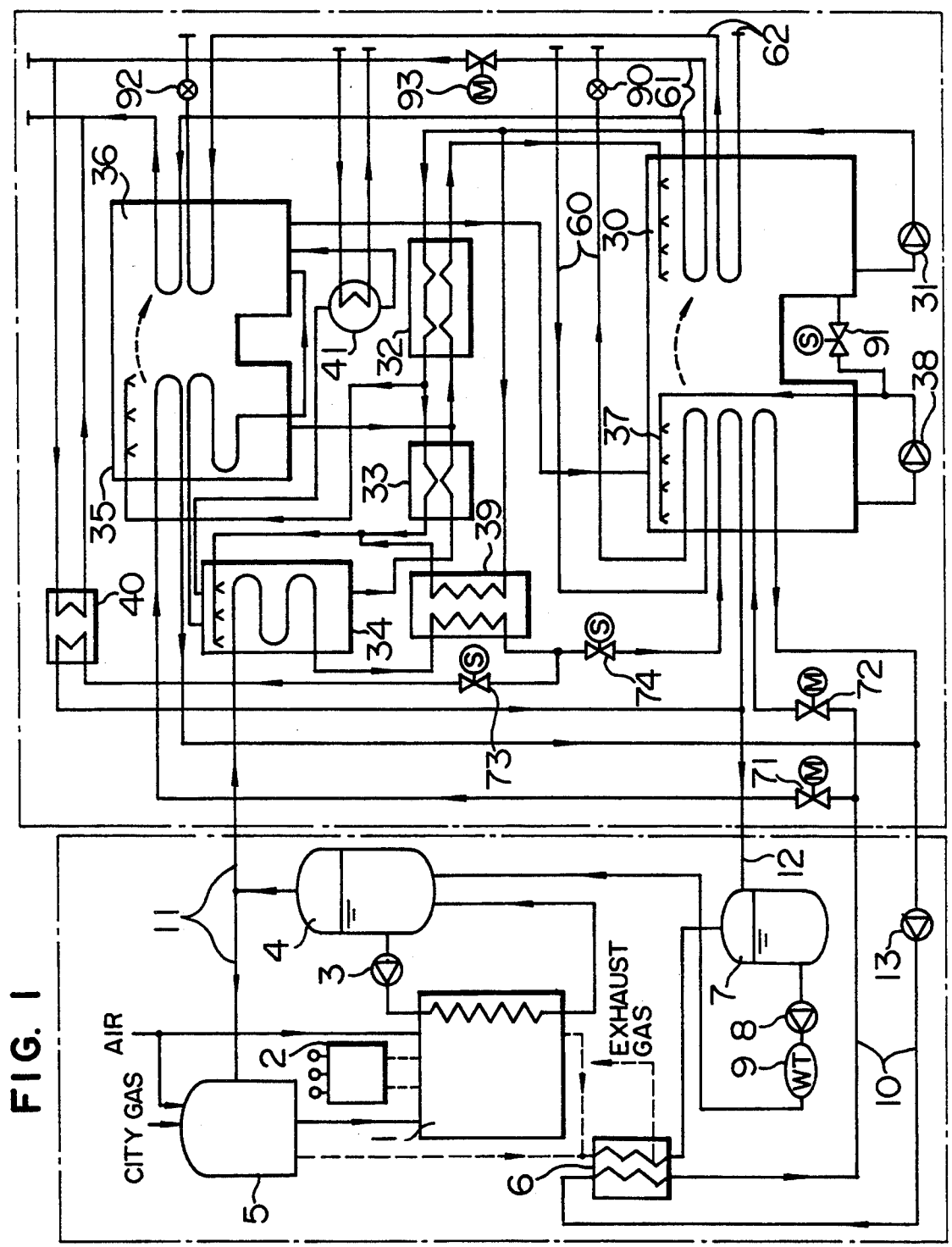
FIGURE 1 is a diagram showing a flow in an embodiment of the present invention.

In FIGURE 1 showing an embodiment of the present invention, a fuel cell is enclosed by one-dot-chain lines on the left side of the drawing. The fuel cell comprises a plurality of cycles described below. The fuel cell has a body 1 in which a multiplicity of anodes and cathodes are serially arranged in an electrolyte so that DC electric power generation is performed when the electrodes are supplied with raw materials, that is, hydrogen gas ($H_2$), obtained as described later, and oxygen ($O_2$) in air. The generated DC electricity is passed through a wire no a DC/AC converter 2, in which the DC electricity is converted into AC electricity, and output. Since such power generation entails the generation of heat of reaction, causing the fuel cell body 1 to have a high temperature, the fuel cell body 1 is cooled by cooling water delivered by a cooling water pump 3. Since such cooling water is heated by heat generated in the cell, it is converted into a high-temperature high-pressure water, which is led to a gas-liquid separation tank 4. In this tank 4, the cooling water is boiled, and the resultant water vapor is separated. A part of such water vapor is led through a vapor pipe 11 to a reformer 5 for converting city gas, serving as a material gas, into a gas mainly containing hydrogen gas ($H_2$). Exhaust gas generated by the reformer 5 is led to an exhaust heat exchanger 6, which recovers exhaust heat by obtaining warm water. The other part of the water vapor from the tank 4 is led to the outside of the fuel cell, used in the manner described later, returned as drain water through a pipe 12 into the fuel cell, and temporarily stored in a recovered water tank 7 in the from of a mixture with water for recovering exhaust gas. Thereafter, such mixture is delivered by a cooling-water circulation pump 8 through a water-quality maintenance device 9 to the gas-liquid separation tank 4, so that the mixture can be sent as cooling water to the fuel cell body 1. The above cycle enables the fuel cell to continuously generate electric power.

Exhaust heat obtained from the fuel cell in this way is taken to the outside of the cell through pipes 11 and 10 in the form of water vapor and warm water.

A flow in an absorption heat pump capable of utilizing exhaust heat according to the present invention is depicted on the right side of the drawing, and enclosed by the corresponding one-dot-chain lines.

Cycles in an operation for cooling a predetermined space by utilizing water-vapor exhaust heat and warm-water exhaust heat will be described. A space cooling operation will be performed in the following manner.

An absorber 30 prepares a dilute solution diluted with a coolant (water). A solution pump 3i delivers dilute solution from the absorber 30 through a low-temperature solution heat exchanger 32 and a high-temperature solution heat exchanger 33 to a high-temperature regenerator 34. In this regenerator 34, dilute solution is heated by high-temperature high-pressure vapor (normally comprising saturated water vapor of 4 to 8 kg/cm$^2$G) supplied through the vapor pipe 11 from the fuel cell 1, so that the coolant is evaporated and condensed. A portion of dilute solution branches off from the exit of the low-temperature solution heat exchanger 32, and is sent to a low-temperature regenerator 35. In this regenerator 35, the portion of the dilute solution is heated by warm water pressure-delivered by a warm-water pump 13 in the fuel cell 1 and supplied to the low-temperature regenerator 35 through a cooling-/heating switching valve 71, and then performs beam exchange with coolant vapor generated from the high-temperature regenerator 34 so as to generate secondary coolant vapor and become concentrated. Concentrated solution resulting from condensation in the high-temperature regenerator 34 passes through the high-temperature solution heat exchanger 33, and passes, together with another portion of concentrated solution from the low-temperature regenerator 35, through the low-temperature solution heat exchanger 32, and is sprayed into the absorber 30. Coolant vapor generated by the high-temperature regenerator 34 and that generated by the low-temperature regenerator 35 are condensed by the low-temperature regenerator 35 and a condenser 36, whereby the coolant vapors are converted into a coolant liquid, which is caused to flow down into an evaporator 37. In the evaporator 37, the coolant is sprayed by a coolant spray pump 38 in the interior of the evaporator 37, is evaporated by obtaining heat of evaporation from cool water in a cool water pipe 60, passes through a vapor passage between the evaporator 37 and the absorber 30, and is absorbed by concentrated solution sprayed in the absorber 30. Heat of condensation of coolant generated in the absorber 30 is removed by cooling water flowing in a cooling water pipe 61 for cooling-water circulation. Cooling water in this pipe 61 circulates through the absorber 30, then circulates through the condenser 36 so as to deprive coolant vapor generated in the low-temperature regenerator 35 of its heat of condensation. Thereafter, the cooling water is sent to a cooling tower (not shown), where the cooling water dissipates such heat of condensation to open air, and cools off. Vapor supplied to and used in the high-temperature regenerator 34 is condensed into vapor drain water. The vapor drain water is cooled by a drain cooler 39 for preheating dilute solution, and is sent through a drain solenoid valve 73 to a drain heat exchanger 40, in which the vapor drain water performs heat exchange with cooling water flowing in a branch of the pipe 61. Then, the vapor drain water is further cooled, and returned through the drain return pipe 12 into the recovery water tank 7 in The fuel cell. In this way, the temperature of such vapor drain water is controlled below the level withstandable by the water-quality maintenance device 9 provided for cooling water for the fuel cell.

Thus, vapor exhaust heat and warm-water exhaust heat is used to produce low temperature heat. This arrangement, when compared with the use of vapor exhaust heat only, enables the low-temperature producibility to be increased by an amount corresponding to the use of warm-water exhaust heat. Specifically, when the level of low-temperature producibility provided by the use of vapor exhaust heat only is expressed as "i", the addition of unit heat quantity of warm water normally increases the producibility level to approximately "1.6".

When the cooling load decreases, a cool-water temperature detector 90 detects a corresponding decrease in the temperature of cool water, and causes a coolant blow solenoid valve 91 to open. As a result, coolant in the evaporator 37 is discharged therefrom to the absorber 30, so that the amount of coolant sprayed in the evaporator 37 by the coolant spray pump 38 decreases, and also the concentration of solution within the absorber 30 lowers, whereby the quantity of heat of evaporation received from cool water in the cool water pipe 60 is decreased, and thus, the cooling ability is decreased. When the cooling load increases, and the temperature of cool water is accordingly increased, the coolant blow solenoid valve 91 is closed by an electrical signal from the detector 90. As a result, the amount of sprayed coolant is increased, and thus, the cooling ability is increased.

Since the operation of the fuel cell is continued while vapor exhaust heat and warm-water exhaust heat are continuously consumed as described above, smooth operation of the fuel cell is possible.

If it is desired to allow high-temperature water for hot-water supply to be obtained during a space cooling operation, a part of coolant vapor evaporated in the high-temperature regenerator 34 may be led from this regenerator 34 to a water-supply heat exchanger 41, in which heat exchange is performed to obtain high-temperature water for hot-water supply.

An operation for heating a predetermined space or an operation for extracting hot water for water supply is performed in the following manner. The valves 71 and 73 are closed for switching from a space cooling operation, and coolant switching valves 72 and 74 are opened, so that warm-water from the fuel cell which has exhaust heat and drain water from the high-temperature regenerator 34 are passed through the evaporator 37. In this case, the flow of solution and coolant in the heat pump cycle is the same as the above-described operation except that warm water is extracted from a warm water pipe 62 which, similarly to the cooling water system 61, allows circulation through the absorber 30 and then through the condenser 36. The coefficient of performance $\epsilon$ of the heating cycle is expressed by the following equation:

$$\epsilon = \frac{Q_A + Q_C}{Q_G} = \frac{Q_G + Q_E}{Q_G} = 1 + \frac{Q_E}{Q_G} > 1 \qquad (1)$$

(where
$Q_G$: Quantity of heat input by vapor to high-temperature regenerator
$Q_A$: Quantity of heat output from absorber
$Q_C$: Quantity of heat output from condenser
$Q_E$: Quantity of heat input to evaporator (=warm water exhaust heat quantity+vapor drain water heat quantity)
$Q_G+Q_E=Q_A+Q_C$)

From the equation (1), the coefficient of performance $\epsilon$ is greater than 1, and is increased from the value achievable with a conventional arrangement using vapor heating alone by ($Q_E/Q_G$). Moreover, it is possible to obtain warm water having a relatively high temperature of 70° to 80° C., which in turn makes it possible to use such warm water for hot-water supply as well as heating. When the heating lead or the hot-water supply load decreases, a warm-water temperature detector 92 detects a corresponding increase in the temperature of warm water, and causes a cooling-water controlling motor-operated valve 93 to open. As a result, cooling water is supplied to the absorber 30 and the condenser 36, so that heat energy produced by the heat pump cycle is discharged to the cooling water. When the heating load or the hot-water supply load increases to be secured, and the temperature of warm water decreases accordingly, the cooling-water controlling motor-operated valve 93 is closed by an electrical signal from the detector 92, so that the heating ability is increased to be secured.

Thus, also in a heating operation, the operation of the fuel cell is continued while vapor exhaust heat and warm-water exhaust heat are continuously consumed, thereby enabling smooth operation of the fuel cell.

Although the foregoing embodiment shows an absorption heat pump and a cogeneration system that utilizes exhaust heat, the present invention is not intended to be limited by the embodiment. The present invention may be embodied as a system having another cycle arrangement so long as the system incorporates an absorption-type refrigerator or an absorption heat pump.

Although the foregoing embodiment concerns utilizing exhaust heat from a fuel cell, the present invention may also be applied to a cogeneration system utilizing exhaust heat from an engine, a turbine or the like.

What is claimed is:

1. An absorption heat pump which has an evaporator, an absorber, a high-temperature regenerator, a low-temperature regenerator and a condenser and which is capable of utilizing exhaust heat, said absorption heat pump capable of utilizing exhaust heat comprising: a first cycle in which vapor exhaust heat from a fuel cell is used as a heat source for said high-temperature regenerator and said evaporator; and a second cycle in which warm-water exhaust heat from the fuel cell is used as a heat source for said low-temperature regenerator.

2. An absorption heat pump which has an evaporator, an absorber, a high-temperature regenerator, a low-temperature regenerator and a condenser and which is capable of utilizing exhaust heat, said absorption heat pump capable of utilizing exhaust heat comprising: a first cycle in which vapor exhaust heat from a fuel cell is used as a heat source for said high-temperature regenerator; a second cycle in which vapor exhaust heat and warm-water exhaust heat from the fuel cell are used as a heat source for said evaporator; and a third cycle in which warm-water exhaust heat from the fuel cell is used as a heat source for said low-temperature regenerator.

3. A cogeneration system including an absorption heat pump which has an evaporator, an absorber, a high-temperature regenerator, a low-temperature regenerator and a condenser and which is capable of utilizing exhaust heat, said cogeneration system being capable of utilizing exhaust heat, wherein said absorption heat pump comprises a first cycle in which vapor exhaust heat from a fuel cell is used as a heat source for said high-temperature regenerator and said evaporator, and a second cycle in which warm-water exhaust heat from the fuel cell is used as a heat source for said low-temperature regenerator, said absorption heat pump being combined with the fuel cell.

4. An absorption heat pump which has an evaporator, an absorber, a high-temperature regenerator, a low-temperature regenerator and a condenser and which is capable of utilizing exhaust heat, said absorption heat pump capable of utilizing exhaust heat comprising: a cool water extracting cycle in which vapor exhaust heat from a fuel cell is supplied as a heat source to said high-temperature regenerator and said evaporator while warm-water exhaust heat is supplied to said low-temperature regenerator so as to extract cool water from said evaporator; a warm-water extracting cycle in which vapor exhaust heat is supplied as a heat source to said high-temperature regenerator while warm-water exhaust heat is supplied as a heat source to said evaporator so as to extract warm water therefrom; and cycle switching means through which said cycles are switchably joined together.

5. An absorption heat pump according to claim 4, wherein the heat source supplied to said evaporator in warm-water extracting cycle comprises drain water obtained from vapor in said high-temperature regenerator.

6. An absorption heat pump which has an evaporator, an absorber, a high-temperature regenerator, a low-temperature regenerator and a condenser and which is capable of utilizing exhaust heat, said absorption heat pump capable of utilizing exhaust heat comprising: a pipe for hot-water supply; a detector provided in said pipe for detecting hot-water supply load during a hot-water supplying operation; and means for passing cooling water through an interior of said heat pump, the passage of cooling water being controlled in accordance with the output of said detector when the hot-water supply load has decreased so that vapor exhaust heat and warm-water exhaust heat is discharged to cooling water.

7. A cogeneration system including an absorption heat pump which has an evaporator, an absorber, a high-temperature regenerator, a low-temperature regenerator and a condenser and which is capable of utilizing exhaust heat, said cogeneration system being capable of utilizing exhaust heat, wherein said cogeneration system comprises a sub-system which, during a space cooling operation, employs an absorption water-cooler/heater adapted to be supplied with heat sources by making double use and single use of vapor exhaust heat and warm-water exhaust heat from a fuel cell; and a heat pump cycle in which, during a space heating operation, said evaporator is supplied with, as its heat source, warm-water exhaust heat obtained from the fuel cell and drain water obtained from said high-temperature regenerator as a result of using vapor exhaust heat therein, said sub-system and said heat pump cycle being combined with the fuel cell.

* * * * *